(12) United States Patent
Li et al.

(10) Patent No.: US 8,983,182 B1
(45) Date of Patent: Mar. 17, 2015

(54) SYSTEM AND METHOD FOR ESTIMATING CONTINUOUS TONE VALUES FROM RENDERED BINARY INPUT

(71) Applicant: XEROX Corporation, Norwalk, CT (US)

(72) Inventors: Xing Li, Webster, NY (US); David Jon Metcalfe, Marion, NY (US); Robert Robideau, Webster, NY (US)

(73) Assignee: XEROX Corporation, Norwalk, CT (US)

( * ) Notice: Subject to any disclaimer, the term of this patent is extended or adjusted under 35 U.S.C. 154(b) by 20 days.

(21) Appl. No.: 14/029,903

(22) Filed: Sep. 18, 2013

(51) Int. Cl.
| | | |
|---|---|---|
| G06K 9/00 | (2006.01) | |
| G06K 15/00 | (2006.01) | |
| G06K 15/02 | (2006.01) | |
| H04N 1/405 | (2006.01) | |
| H04N 1/40 | (2006.01) | |
| G06T 11/00 | (2006.01) | |
| G06T 7/40 | (2006.01) | |

(52) U.S. Cl.
CPC ............ G06K 15/1881 (2013.01); H04N 1/405 (2013.01); H04N 1/40075 (2013.01); H04N 1/4051 (2013.01); H04N 1/4055 (2013.01); H04N 1/4058 (2013.01); G06T 11/001 (2013.01); G06T 7/408 (2013.01)
USPC .......................... 382/162; 358/3.06; 358/3.08

(58) Field of Classification Search
CPC . H04N 1/40075; H04N 1/405; H04N 1/4051; H04N 1/4055; H04N 1/40045; H04N 1/4058; G06T 11/001; G06T 7/408
USPC .......................... 382/162; 358/1.9, 3.06, 3.08
See application file for complete search history.

(56) References Cited

U.S. PATENT DOCUMENTS

| | | | | |
|---|---|---|---|---|
| 5,027,078 | A | * | 6/1991 | Fan ............................... 358/3.08 |
| 5,166,809 | A | * | 11/1992 | Surbrook ........................ 358/1.9 |
| 5,301,267 | A | * | 4/1994 | Hassett et al. ................. 345/469 |
| 5,339,170 | A | * | 8/1994 | Fan ............................... 358/3.08 |
| 6,101,285 | A | * | 8/2000 | Fan ............................... 382/260 |
| 6,185,334 | B1 | * | 2/2001 | Cheung et al. ................ 382/199 |
| 6,347,153 | B1 | * | 2/2002 | Triplett et al. ................. 382/224 |
| 6,347,159 | B1 | * | 2/2002 | Williams et al. .............. 382/252 |
| 8,867,100 | B2 | * | 10/2014 | Lau et al. ...................... 358/3.03 |
| 2010/0290089 | A1 | | 11/2010 | Stevens |
| 2011/0051197 | A1 | | 3/2011 | Yao et al. |
| 2011/0243429 | A1 | | 10/2011 | Yao |

\* cited by examiner

*Primary Examiner* — Kanjibhai Patel
(74) *Attorney, Agent, or Firm* — Pillsbury Winthrop Shaw Pittman, LLP (57) ABSTRACT

A method and system for estimating continuous tone values associated with input pixels in a color image are provided. The method includes receiving binarized halftone image data representing a color image, wherein the color image has a plurality of input pixels; and estimating the continuous tone values associated with each of the input pixels by: establishing a window comprising a pixel of interest and neighboring pixels in the binarized halftone image data, wherein the window comprises a plurality of sub-window's and wherein each sub-window has a plurality of predetermined number of rows and columns of pixels; and processing the binarized halftone image data in both a process direction and a cross-process direction using the window such that the processing is performed for one of the pixels in each of the rows within the sub-window and the processing is skipped for the remaining pixels in that row of that sub-window.

10 Claims, 6 Drawing Sheets

SYSTEM AND METHOD FOR ESTIMATING CONTINUOUS TONE VALUES FROM RENDERED BINARY INPUT

BACKGROUND

1. Field

The present disclosure relates to systems and methods for estimating continuous tone values associated with input pixels in a color image. Specifically, the present disclosure relates to systems and methods for estimating continuous tone values from rendered binary input values.

2. Description of Related Art

Digital images may be formatted as continuous tone (contone) images having a wide range of tonal values or may be formatted as coarsely quantized images having a limited number of tonal values, such as two levels for a binary image. Digital halftoning is a process of transforming a continuous tone image to a coarsely quantized image. Digital halftoning is an important step in printing or displaying digital images possessing contone color tones because most printing processes are operating in a binary mode. Examples of such marking processes are offset printing presses, xerography, and ink-jet printing. In these processes, for each color separation of an image, a corresponding colorant spot is either printed or not printed at any specified image location, or pixel. Digital halftoning controls the printing of color dots formed by combinations of colorant spots of a colorant set, where the spatial averaging of the printed colorant dots, such as by the human visual system, provides the illusion of the required continuous tones.

In many image processing functions, there is a need to estimate continuous tone values from a rendered binary input. A contone estimate value is generated by finding the maximum halftone threshold from all "ON" pixel locations in a small window. In algorithms such as binary domain trapping and binary domain edge enhancement, for example, often what is needed is an array of continuous tone estimate values generated from an array of small windows around the pixel of interest. This generally means a substantial amount of parallel processing and therefore a substantial amount of logic resources.

Figure 1:
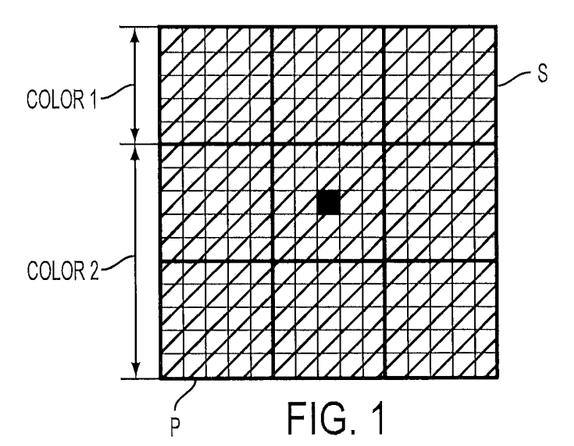
FIG. 1 shows a sliding window that is employed across a digital image data in a hardware or software digital image processing system.

For example, FIG. 1 shows an exemplary 3×3 array of small windows used in a sliding window approach for continuous tone values estimation. These 5×5 or 25-pixels small windows generally move with the pixel of interest P for continuous tone values estimation. The "sliding window" may generally be described as a window that moves one pixel/one scan line at a time. In other words, the center or some other reference point in the window moves through every pixel. This sliding window approach is quite expensive to implement as it involves a large amount of parallel processing.

Figure 2:
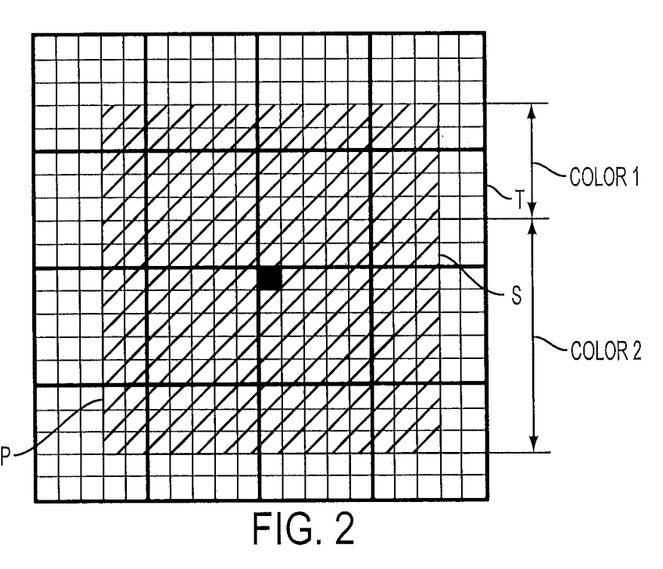
FIG. 2 shows a tiling window that is employed on the digital image data in the hardware or software digital image processing system.

One way to make the design simpler is to use a tiling window approach instead of the sliding window approach. FIG. 2 illustrates an exemplary tiling window T has sixteen small tiles or small tiling windows. That is, the tiling window T has four tiles in each of the four rows. Each small tile or tiling window includes 5×5 or 25 pixels. The "tiling window" may generally be described as a window that moves by the dimension of the window each time (i.e., in the case of non-overlapping tiling window). However, besides the compromise in estimation accuracy associated with the tiling window approach, more memory is needed for the continuous tone estimate result and the binary context to line up. Also, in this tiling window approach, in order to obtain continuous tone estimate value from a uniform area some distance away from the current pixel of interest P, an additional row of windows is needed.

The sliding window S is also shown in FIG. 2 to illustrate the aspect that more rows (or an additional row of tiles) are needed in the tiling window approach in order to cover the context that the sliding window S covers with respect to the current pixel of interest.

Accordingly, what is needed in this art is an improved method that is configured to estimate continuous tone values from rendered binary input such that the improved method not only reduces the needed logic resources but also avoids an increase in memory consumption.

SUMMARY

In one embodiment, a method for estimating continuous tone values associated with input pixels in a color image is provided. The method is implemented in a computer system comprising one or more processors configured to execute one or more computer program modules. The method includes receiving binarized halftone image data representing a color image, wherein the color image has a plurality of input pixels; and establishing a window comprising a pixel of interest and neighboring pixels in the binarized halftone image data, wherein the window comprises a plurality of sub-windows and wherein each sub-window has a plurality of predetermined number of rows and columns of pixels; and processing the binarized halftone image data in both a process direction and a cross-process direction using the window such that the processing is performed for one of the pixels in each of the rows within the sub-window and the processing is skipped for the remaining pixels in that row of that sub-window.

In another embodiment, a system for estimating continuous tone values associated with input pixels in a color image is provided. The system includes at least one processor configured to receive binarized halftone image data representing a color image, wherein the color image has a plurality of input pixels; and estimate the continuous tone values associated with each of the input pixels by: establishing a window comprising a pixel of interest and neighboring pixels in the binarized halftone image data, wherein the window comprises a plurality of sub-windows and wherein each sub-window has a plurality of predetermined number of rows and columns of pixels; and processing the binarized halftone image data in both a process direction and a cross-process direction using the window such that the processing is performed for one of the pixels in each of the rows within the sub-window and the processing is skipped for the remaining pixels in that row of that sub-window.

Other objects, features, and advantages of one or more embodiments will become apparent from the following detailed description, and accompanying drawings, and the appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

The present disclosure proposes a hybrid method in generating an array of continuous tone estimate values from rendered binary input. Specifically, the hybrid method of the present disclosure uses a tiling window approach in one direction (i.e., a cross-process direction or fast scan direction) and a sliding window approach in the other direction (i.e., a process direction or slow scan direction).

The image printing system generally has two important dimensions: the process (or slow scan) direction and the cross-process (or fast scan) direction. The direction in which the image bearing surface moves is referred to as process (or slow scan) direction, and the direction in which the plurality of sensors are oriented is referred to as cross-process (or fast scan) direction. The cross-process (or fast scan) direction is generally perpendicular to the process (or slow scan) direction.

Figure 3:
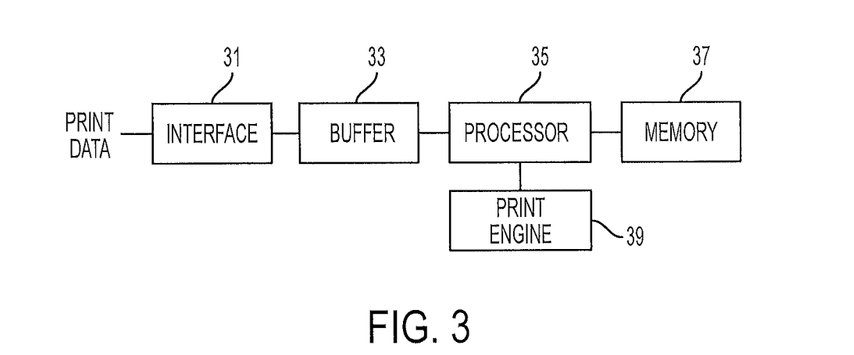
FIG. 3 shows a schematic block diagram of an embodiment of an image printing system.

FIG. 3 is a schematic block diagram of an embodiment of an image printing apparatus that includes an interface 31 that receives print data, for example from a host computer, and stores the print data in a buffer memory 33. A processor 35 is configured to process the print data to produce bit mapped raster data that is stored in a memory 37. A print engine 39 prints an image pursuant to the bit mapped raster data generated by the processor 35. The print engine 39 can be an electrostatographic print engine or an ink jet print engine, for example.

Printing is accomplished by selectively printing, depositing, applying or otherwise forming markings such as dots on a receiver surface or substrate that can be a print output medium such as paper or a transfer surface such as a transfer belt or drum. If a transfer surface is used, the image formed or printed on the transfer surface is appropriately transferred to a print output medium such as paper.

An array of pixel locations can generally be used to define the locations on a print output medium that can be marked or printed. A marking of a particular primary color (e.g., cyan, magenta, yellow or black) that is printed or deposited at a pixel location can be conveniently called a dot. Each pixel location can, for example, be marked or printed with (a) one or more non-black primary color dots (e.g., cyan, magenta or yellow), (b) a black dot by itself, or (c) a black dot and at least one non-black primary color dot.

Print data typically comprises continuous tone data (such as 32-bit or 24-bit pixel data), and halftoning (e.g., using one or more halftone threshold arrays) is commonly employed to map or transform continuous tone data to halftoned data that describes the primary color or colors, if any, that is/are to be printed at the corresponding output pixel location. For example, the halftoned data can comprise one bit data per pixel per primary color or multi-bit data per pixel per primary color, wherein the multi-bit data contains fewer bits than the continuous tone data (e.g., eight or four bits).

Pursuant to halftoning, the array more particularly comprises an array or collection of identically shaped halftone cells for each primary color, wherein the halftone cell configuration for each primary color can be different. Thus, each pixel can have a different intra-cell location or position in the respective halftone cells for the different primary colors. A halftone cell includes a relatively small number of pixels, and each of the halftone cells for a primary color can have the same fill order. For convenience, pixels having the same intra-cell position or location in a particular primary color halftone cell array can be referred to as pixels that are correspondingly located in halftone cells for a primary color.

A halftone cell may generally correspond to a halftone array. A window, in the context of contone value estimate, is an array of pixels that may or may not be of the same size as the halftone array. For example, the window size is predefined and limited, while halftone array may have a wide selection of sizes.

In one embodiment of the present disclosure, binarized halftone image data is received as an input, an algorithm estimates the C, M and Y continuous-tone values from the received binarized halftone image data. The binarized halftone image data represents a color image having a plurality of input pixels.

Figure 4:
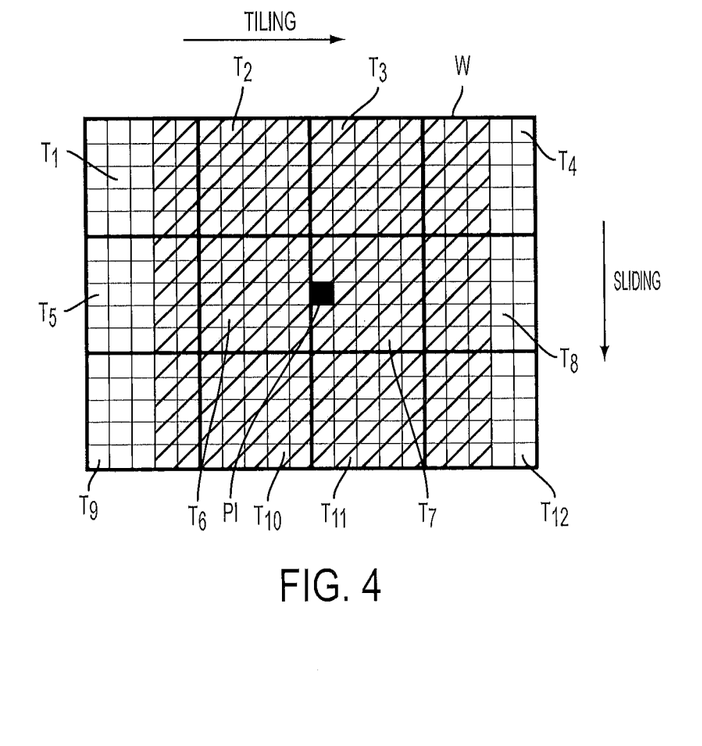
FIG. 4 shows a pixel array with a hybrid window for estimating the continuous tone values associated with each of the input pixels in accordance with an embodiment of the present disclosure.

As shown in FIG. 4, the received binarized halftone data is represented by a plurality of scan lines SL. Each scan line SL is formed by a plurality of pixels P.

A pixel of interest PI is shown in FIG. 4. The "pixel of interest," as used herein, generally refers to a pixel to be processed in the input image data. The pixels in the input image data are sequentially set as the pixel of interest. For example, in input image data in which pixels are arranged in a matrix form along the primary scan direction and the secondary scan direction, the pixel of interest is moved in a predetermined order along the primary scan direction and the secondary scan direction.

In FIG. 4, a window W that is used to generate an array of continuous tone estimate values from rendered binary input is shown. The exemplary widow W includes twelve tiles or sub-windows $T_1$ to $T_{12}$ with four sub-windows or tiles being placed in each of the three rows of the received binarized halftone image data. As shown in FIG. 4, these tiles or sub-windows are arranged side-by-side with no spacing between them. These tiles or sub-windows do not overlap with each other. That is, these twelve sub-windows are tiled in the fast scan direction and sliding in the slow scan direction.

The shaded pixels in FIG. 4 shows a comparison of the hybrid approach of the present patent application with an allsliding window approach (i.e., a three-by three array of the sliding window sliding in both fast scan and slow scan directions). The comparison shows that, in the "hybrid" approach of the present patent application, the process direction or slow-scan context is the same as that of the all-sliding window approach, while the cross-process direction or fast-scan context is bigger than that of the all-sliding window approach. That is, the "hybrid" approach of the present patent application uses four sub-windows in the cross-process or fast-scan direction to perform the equivalent function performed by three windows in the cross-process or fast-scan direction in the all sliding window approach.

Each tile or sub-window T includes 25 pixels. Though tiles or sub-windows having 25 pixels are used herein as an example, tiles or sub-windows of other sizes are also within the scope of this disclosure. Also, though twelve sub-windows $T_1$ to $T_{12}$ are shown in FIG. 4, the number of sub-windows or tiles used for processing the received binarized halftone image data can vary significantly in number.

FIG. 4 also shows a pixel of interest PI and its neighboring or peripheral pixels. In one embodiment, the pixel of interest PI may be a pixel that is to be processed based on its neighboring pixels in the window W, for example.

The received binarized halftone image is processed both in a process or slow scan direction and in a cross-process or a fast scan direction using the window W. The processing of the received binarized halftone image data for estimating the continuous tone values associated with each of the input pixels is explained with reference to FIGS. 5-6.

Figure 5:
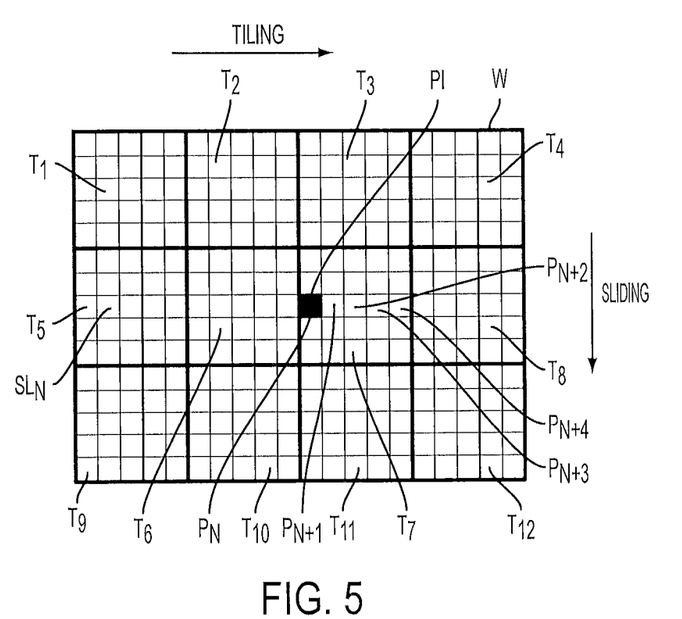
FIGS. 5-6 show an exemplary hybrid approach in which a hybrid window is employed on digital image data in accordance with an embodiment of the present disclosure.

Referring to FIG. 5, the pixel of interest PI is a pixel $P_N$ on scanline $SL_N$. The continuous tone values for the current pixel of interest $P_N$ are processed based on the pixels in tiles or sub-windows $T_1, T_2, T_3, T_4, T_5, T_6, T_7, T_8, T_9, T_{10}, T_{11}$, and $T_{12}$. In one embodiment, the continuous tone values for the current pixel of interest $P_N$ are processed by determining maximum halftone thresholds from all the "ON" pixel locations in the tiles or sub-windows $T_1, T_2, T_3, T_4, T_5, T_6, T_7, T_8, T_9, T_{10}, T_{11}$, and $T_{12}$.

The techniques for generating continuous tone values from an array of windows is described in greater detail, for example, in U.S. Patent Application Publication No. 20110243429, which is incorporated by reference in its entirety. Therefore, these techniques are not described in detail here.

Referring to FIG. 5, the pixel of interest $P_N$ and the next four pixels of interest $P_{N+1}, P_{N+2}, P_{N+3}$, and $P_{N+4}$ all are on the same row of the same sub-window. The window W (with its non-overlapping sub-windows) moves each time by the dimension of the sub-window or tile in the cross-process direction (or fast-scan direction). Hence, no further processing of any new pixels is required to obtain the continuous tone values for the next four pixels of interest $P_{N+1}, P_{N+2}, P_{N+3}$, and $P_{N+4}$. As each of the pixels of interest $P_N, P_{N+1}, P_{N+2}, P_{N+3}$, and $P_{N+4}$ uses the pixels of the same tiles for processing, the continuous tone values for each of the pixels of interest $P_{N+1}, P_{N+2}, P_{N+3}$, and $P_{N+4}$ are same as the continuous tone values for the pixel of interest $P_N$.

Therefore, according to the embodiments of the present disclosure, no further processing of the pixels is required to estimate the continuous tone values of the current pixel of interest as long as the current pixel of interest lies in the same row and within the same sub-window.

Figure 6:
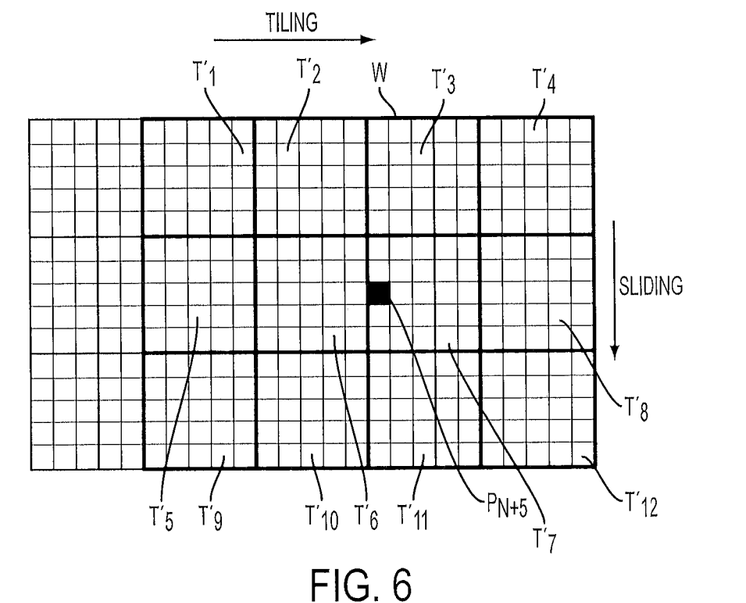

Referring to FIGS. 5 and 6, the widow W moved in the cross-process/fast-scan direction so that the pixel of interest PI is at pixel $P_{N+5}$ on the same scanline $SL_N$. The continuous tone values for the new current pixel of interest $P_{N+5}$ are processed based on the pixels in corresponding tiles or sub-windows $T_1', T_2', T_3', T_4', T_5', T_6', T_7', T_8', T_9', T_{10}', T_{11}'$, and $T_{12}'$. In one embodiment, the continuous tone values for the current pixel of interest $P_{N+5}$ are processed by determining maximum halftone thresholds from all the "ON" pixel locations in the tiles or sub-windows $T_1', T_2', T_3', T_4', T_5', T_6', T_7', T_8', T_9', T_{10}', T_{11}'$, and $T_{12}'$.

As shown in FIG. 6, the tiles or sub-windows $T_4', T_8'$, and $T_{12}'$ now include pixels that were not previously processed (i.e., during the processing of the pixels $P_N, P_{N+1}, P_{N+2}, P_{N+3}$, and $P_{N+4}$). Therefore, these new pixels within the tiles or sub-windows $T_4', T_8'$, and $T_{12}'$ are processed to obtain the continuous tone values for the current pixel of interest $P_{N+5}$.

As the pixels within the remaining tiles or sub-windows $T_1', T_2', T_3', T_5', T_6', T_7', T_9', T_{10}'$, and $T_{11}'$ were previously processed (i.e., during the processing of the pixels $P_N, P_{N+1}, P_{N+2}, P_{N+3}$, and $P_{N+4}$) and stored in the memory, the values of those pixels are simply obtained from the memory. That is, the pixels within the tiles or sub-windows $T_1', T_2', T_3', T_5', T_6', T_7', T_9', T_{10}'$, and $T_{11}'$ of FIG. 6 correspond to the pixels within the tiles or sub-windows $T_2, T_3, T_4, T_6, T_7, T_8, T_{10}, T_{11}$, and $T_{12}$ of FIG. 5. Thus, the continuous tone values for the current pixel of interest $P_{N+5}$ are determined using the values of new pixels within the tiles or sub-windows $T_4', T_8'$, and $T_{12}'$ and using the values of the previously processed pixels within the remaining tiles or sub-windows $T_1', T_2', T_3', T_5', T_6', T_7', T_9', T_{10}'$, and $T_{11}'$.

After the last pixel in the current scan line is processed, a next scanline (e.g., $SL_{N+1}$ shown in FIG. 4) will be taken up for processing. When the processing moves to the next or new scanline, there are no previously processed pixel values that are stored in the memory and that could be used for processing the current pixel of interest. In other words, as the window "movement" in the process direction is sliding, there are no previously processed pixel values that could be made use of going from one scanline to the next scanline.

Figure 7:
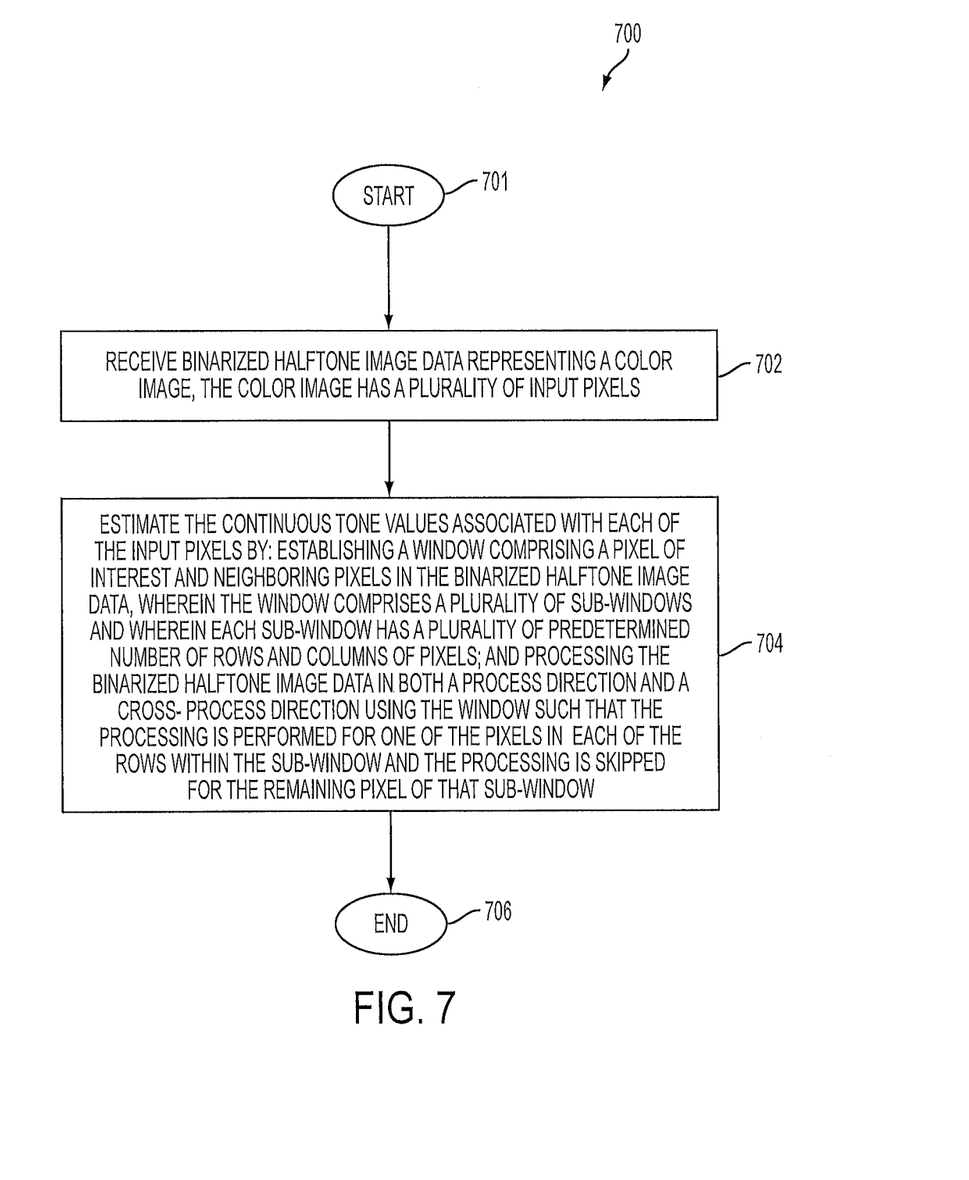
FIG. 7 shows a schematic flow diagram of a method for estimating continuous tone values from rendered binary input in accordance with an embodiment of the present disclosure.

FIG. 7 shows a schematic flow diagram of a method 700 for estimating continuous tone values from rendered binary input in accordance with an embodiment of the present disclosure.

The method 700 is implemented in a computer system comprising one or more processors configured to execute one or more computer program modules. The method 700 begins at procedure 701.

Referring to FIGS. 3-7, at procedure 702, binarized halftone image data is received as an input. The binarized halftone image data represents a color image having a plurality of input pixels.

Next at procedure 704, the continuous tone values associated with each of the input pixels are estimated by: establishing a window comprising a pixel of interest and neighboring pixels in the binarized halftone image data, wherein the window comprises a plurality of sub-windows and wherein each sub-window has a plurality of predetermined number of rows and columns of pixels; and processing the binarized halftone image data in both a process direction and a cross-process direction using the window such that the processing is performed for one of the pixels in each of the rows within the sub-window and the processing is skipped for the remaining pixels in that row of that sub-window. The details of the procedure 704 are described above with respect to FIGS. 4-6.

For example, in the proposed hybrid approach of the present patent application, if the tile or sub-window size in the cross-process direction is five, then the contone estimate values are generated once for every five pixels in the cross-process direction. As noted above, the color estimate for the current pixel of interest is obtained from the tile(s) that contains the current pixel of interest. The method 700 ends at procedure 706.

The hybrid method of the present disclosure, thus, reduces the memory requirements and also significantly reduces the complexity/cost of a real-time processing system.

The method of the present disclosure significantly reduces the logic resource that is needed than in the all sliding window design, without increasing the memory that is needed as in the all tiling window design. The method of the present disclosure also provides a better estimation accuracy than the all sliding window design. The method of the present disclosure saves costs and reduces processing time for an image processing function that estimates the average color level from binary video.

A print engine, as used herein, generally refers to any device that applies colorants to or generates colorants on a surface to produce an image. The print engine renders the image data onto a medium to produce a hard copy thereof. A print engine may be any arrangement of hardware and associated software helpful in a printed image based on submitted image data in any form, such as a xerographic engine or a set of ink-jet print heads. A single print engine may be dedicated to creating a portion of a desired image, such as to create a single color separation for a full-color image; one page-side image in a machine that provides separate print engines for each side of a printed substrate; or providing a special type of partial image, such as a MICR image on a check.

A processor, as used herein, generally could be dedicated hardware like ASICs or FPGAs, software, or a combination of dedicated hardware and software. For example, a processor may be a microprocessor, a microcontroller, a virtual processor on a virtual machine, circuit elements, logic circuits or devices, an ASICS microchip, soft microprocessor, software emulation of hardware or other device sufficient for processing instructions. The processor may comprise a plurality of modules for processing the data for storage and/or output, for example. It should be noted that the types of modules and processes performed thereon should not be limited to those described herein. For example, more or less devices may be used to perform the described processing procedures. Additionally or alternatively, processor may be in communication with memory. Memory may include data and/or instructions to be executed by the processor. The memory is capable of storing data used by or produced by the processor. The type of memory should not be limiting; for example, the memory may alternatively include random access memory (RAM).

While the present disclosure has been described in connection with what is presently considered to be the most practical and preferred embodiment, it is to be understood that it is capable of further modifications and is not to be limited to the disclosed embodiment, and this application is intended to cover any variations, uses, equivalent arrangements or adaptations of the present disclosure following, in general, the principles of the present disclosure and including such departures from the present disclosure as come within known or customary practice in the art to which the present disclosure pertains, and as may be applied to the essential features hereinbefore set forth and followed in the spirit and scope of the appended claims.

What is claimed is:

1. A method for estimating continuous tone values associated with input pixels in a color image, the method being implemented in a computer system comprising one or more processors configured to execute one or more computer program modules, the method comprising:
    receiving binarized halftone image data representing a color image, wherein the color image has a plurality of input pixels; and
    estimating the continuous tone values associated with each of the input pixels by:
        establishing a window comprising a pixel of interest and neighboring pixels in the binarized halftone image data, wherein the window comprises a plurality of sub-windows and wherein each sub-window has a plurality of predetermined number of rows and columns of pixels; and
        processing the binarized halftone image data in both a process direction and a cross-process direction using the window such that the processing is performed for one of the pixels in each of the rows within the sub-window and the processing is skipped for the remaining pixels in that row of that sub-window.

2. The method of claim 1, wherein the window is configured to move each time by the dimension of the window in the cross-process direction.

3. The method of claim 1, wherein the continuous tone values for the current pixel of interest are estimated by determining maximum halftone thresholds from all the "ON" pixel locations in the sub-window.

4. The method of claim 2, wherein further processing of pixels is not required to estimate the continuous tone values of a new pixel of interest as long as the current pixel of interest lies in the same row and within the same sub-window.

5. The method of claim 1, wherein the estimated continuous tone values are used in binary domain trapping and binary domain edge enhancement methods.

6. A system for estimating continuous tone values associated with input pixels in a color image, the system comprising:
    at least one processor configured to:
        receive binarized halftone image data representing a color image, wherein the color image has a plurality of input pixels; and
        estimate the continuous tone values associated with each of the input pixels by:
            establishing a window comprising a pixel of interest and neighboring pixels in the binarized halftone image data, wherein the window comprises a plurality of sub-windows and wherein each sub-window has a plurality of predetermined number of rows and columns of pixels; and
            processing the binarized halftone image data in both a process direction and a cross-process direction using the window such that the processing is performed for one of the pixels in each of the rows within the sub-window and the processing is skipped for the remaining pixels in that row of that sub-window.

7. The system of claim 6, wherein the window is configured to move each time by the dimension of the sub-window in the cross-process direction.

8. The system of claim 6, wherein the continuous tone values for the current pixel of interest are estimated by determining maximum halftone thresholds from all the "ON" pixel locations in the window.

9. The system of claim 7, wherein further processing of pixels is not required to estimate the continuous tone values of a new pixel of interest as long as the current pixel of interest lies in the same row and within the same sub-window.

10. The system of claim 6, wherein the estimated continuous tone values are used in binary domain trapping and binary domain edge enhancement methods.

\* \* \* \* \*